US012075290B2

(12) United States Patent
Kovacs et al.

(10) Patent No.: US 12,075,290 B2
(45) Date of Patent: Aug. 27, 2024

(54) PROACTIVE TRIGGERING IN TELECOMMUNICATION NETWORKS (71) Applicant: Nokia Technologies Oy, Espoo (FI)

(72) Inventors: Istvan Zsolt Kovacs, Aalborg (DK); Jeroen Wigard, Klarup (DK); Ayaz Ahmed, Bangalore (IN); Samuli Heikki Turtinen, Li (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 424 days.

(21) Appl. No.: 17/611,376

(22) PCT Filed: May 12, 2020

(86) PCT No.: PCT/EP2020/063130
§ 371 (c)(1),
(2) Date: Nov. 15, 2021

(87) PCT Pub. No.: WO2020/229445
PCT Pub. Date: Nov. 19, 2020

(65) Prior Publication Data
US 2022/0225181 A1 Jul. 14, 2022

(30) Foreign Application Priority Data
May 15, 2019 (IN) .............................. 201941019401

(51) Int. Cl.
*H04W 36/00* (2009.01)
*H04W 36/08* (2009.01)
*H04W 76/30* (2018.01)

(52) U.S. Cl.
CPC . *H04W 36/0058* (2018.08); *H04W 36/00837* (2018.08); *H04W 36/08* (2013.01); *H04W 76/30* (2018.02)

(58) Field of Classification Search
CPC ....... H04W 36/0058; H04W 36/00837; H04W 36/08; H04W 76/30
See application file for complete search history.

(56) References Cited

U.S. PATENT DOCUMENTS

2008/0153495 A1* 6/2008 Ogami .................. H04W 36/30
455/436
2013/0215772 A1* 8/2013 Kaur ................. H04W 36/0072
370/332
(Continued)

FOREIGN PATENT DOCUMENTS

WO 2018063073 A1 4/2018
WO 2020229445 A1 11/2020

OTHER PUBLICATIONS

"Conditional Mobility for Non-Terrestrial Networks"; 3GPP RAN WG2 Meeting #106; R2-1907840; May 2019; 5 pgs.

*Primary Examiner* — Elton Williams
(74) *Attorney, Agent, or Firm* — Robert P. Michal, Esq.; Carter Deluca (57) ABSTRACT

A method, apparatus, and a computer-readable storage medium are provided for proactive triggering of handovers in wireless communication networks. In one example implementation, the method may include receiving, by a user equipment (UE), handover configuration information from a first network node of a plurality of network nodes, estimating rate of change values of reference signal (RS) difference measurements, a reference signal (RS) difference measurement being a difference in reference signal (RS) measurements between the first network node and a second network node of one or more second network nodes, comparing the rate of change values with the mapping information received from the first network node, determining one or more timeToPreTrigger values based on the comparison, initiating one or more timeToPreTrigger timers based on the corre-
(Continued)

sponding one or more timeToPreTrigger values, the one or more timeToPreTrigger timers corresponding to different second network nodes, generating one or more measurement reports upon expiration of the one or more timeToPreTrigger timers, and transmitting the one or more measurement reports to the first network node. In an another example implementation, the method may include transmitting, by a first network node of a plurality of network nodes, handover configuration information to a user equipment (UE), receiving a measurement report from the user equipment (UE), the measurement report corresponding to at least one second network node of the one or more second network nodes, selecting, based on the measurement report, a second network node of the one or more second network nodes for performing a handover, and transmitting an indication to the user equipment (UE) about performing the handover to the selected second network node based on the indication.

1 Claim, 8 Drawing Sheets

(56) References Cited

U.S. PATENT DOCUMENTS

| | | |
|---|---|---|
| 2016/0183154 A1 | 6/2016 | Van Der Velde et al. |
| 2020/0015135 A1* | 1/2020 | Ericson ............. H04W 36/0094 |
| 2020/0305014 A1* | 9/2020 | Kim ...................... H04W 76/30 |

* cited by examiner

PROACTIVE TRIGGERING IN TELECOMMUNICATION NETWORKS

CROSS-REFERENCE TO RELATED APPLICATION

This application is the National Stage of, and therefore claims the benefit of, International Application No. PCT/EP2020/063130 filed on May 12, 2020, entitled "PROACTIVE TRIGGERING IN TELECOMMUNICATION NETWORKS," which was published in English under International Publication Number WO 2020/229445 on Nov. 19, 2020, which claims priority to IN Application No. 201941019401 filed on May 15, 2019. The above applications are commonly assigned with this National Stage application and are incorporated herein by reference in their entirety.

TECHNICAL FIELD

This description relates to wireless communications, and in particular, to wireless communications in non-terrestrial networks.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which we referred to as enhanced Node AP or Evolved Node B (eNBs), provide wireless access within a coverage area or cell. In LTE, mobile devices, or mobile stations are referred to as user equipments (UE). LTE has included a number of improvements or developments.

5G New Radio (NR) development is part of a continued mobile broadband evolution process to meet the requirements of 5G, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT), and may offer new types of mission-critical services. Ultra-reliable and low-latency communications (URLLC) devices may require high reliability and very low latency.

SUMMARY

A method, apparatus, and a computer-readable storage medium are provided for proactive triggering of handovers in wireless communication networks. In one example implementation, the method may include receiving, by a user equipment (UE), handover configuration information from a first network node of a plurality of network nodes, estimating rate of change values of reference signal (RS) difference measurements, a reference signal (RS) difference measurement being a difference in reference signal (RS) measurements between the first network node and a second network node of one or more second network nodes, comparing the rate of change values with the mapping information received from the first network node, determining one or more timeToPreTrigger values based on the comparison, initiating one or more timeToPreTrigger timers based on the corresponding one or more timeToPreTrigger values, the one or more timeToPreTrigger timers corresponding to different second network nodes, generating one or more measurement reports upon expiration of the one or more timeToPreTrigger timers, and transmitting the one or more measurement reports to the first network node. In an another example implementation, the method may include transmitting, by a first network node of a plurality of network nodes, handover configuration information to a user equipment (UE), receiving a measurement report from the user equipment (UE), the measurement report corresponding to at least one second network node of the one or more second network nodes, selecting, based on the measurement report, a second network node of the one or more second network nodes for performing a handover, and transmitting an indication to the user equipment (UE) about performing the handover to the selected second network node based on the indication.

DETAILED DESCRIPTION

Figure 1:
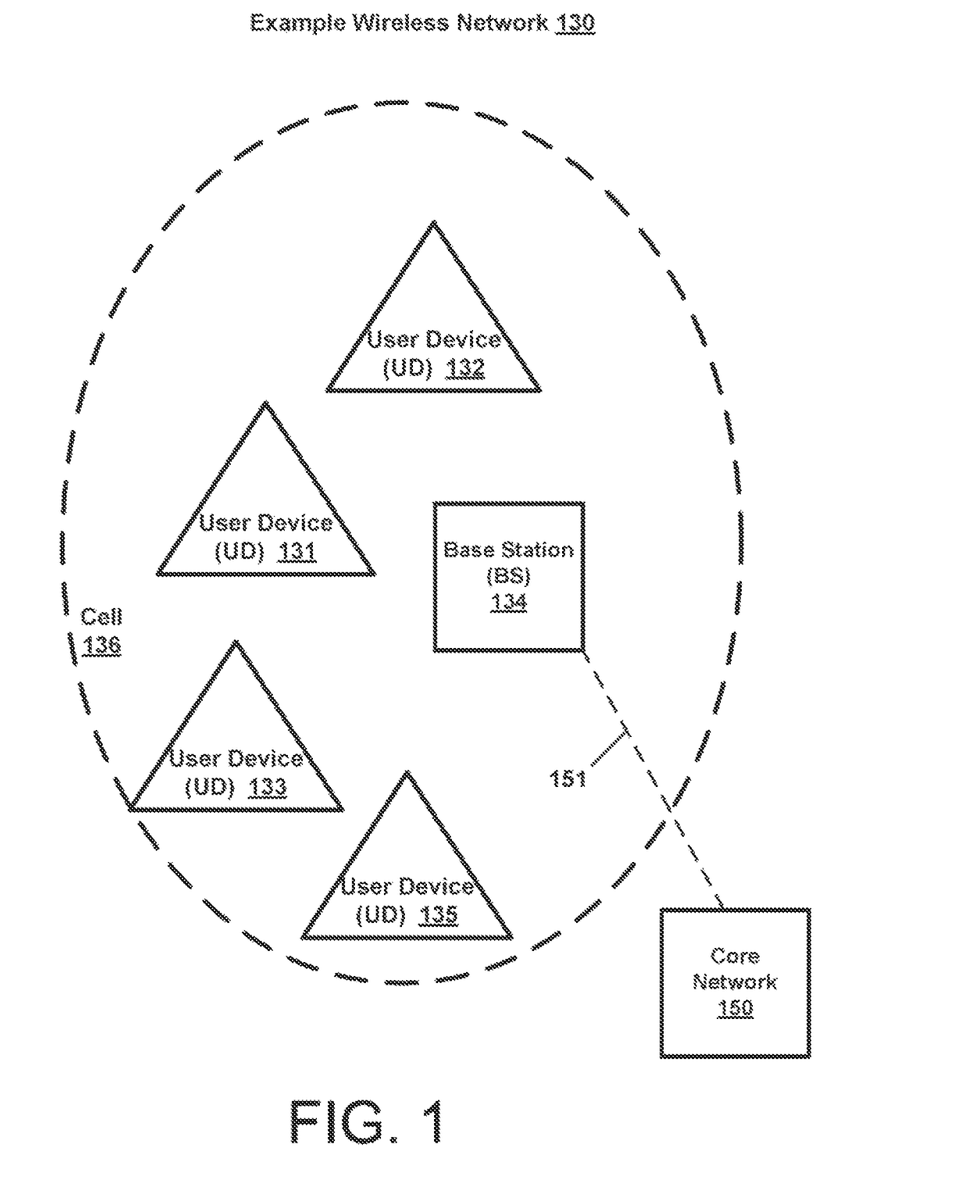
FIG. 1 is a block diagram of a wireless network according to an example implementation.

FIG. 1 is a block diagram of a wireless network 130 according to an example implementation. In the wireless network 130 of FIG. 1, user devices (UDs) 131, 132, 133 and 135, which may also be referred to as mobile stations (MSs) or user equipment (UEs), may be connected (and in communication) with a base station (BS) 134, which may also be referred to as an access point (AP), an enhanced Node B (eNB) or a network node. At least part of the functionalities of an access point (AP), base station (BS) or (e)Node B (eNB) may also be carried out by any node, server or host which may be operably coupled to a transceiver, such as a remote radio head. BS (or AP) 134 provides wireless coverage within a cell 136, including to user devices 131, 132, 133 and 135. Although only four user devices ae shown as being connected or attached to BS 134, any number of user devices may be provided. BS 134 is also connected to a core network 150 via a S1 interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples, or any other wireless device. It should be appreciated that a user device may also be a nearly exclusive uplink only device, of which an example is a camera or video camera loading images or video dips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

In addition, by way of illustrative example, the various example implementations or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC).

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC or machine to machine communications) ma, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is anew data service type, or new usage scenario, which may be supported for New Radio (5G) systems. This enables emerging new applications and services, such as industrial automations, autonomous driving, vehicular safety, e-health services, and so on. 3GPP targets in providing up to e.g., 1 ms U-Plane (user/data plane) latency connectivity with 1-1e-5 reliability, by way of an illustrative example. Thus, for example, URLLC user devices/UEs may require a significantly lower block error rate than other types of user devices/UEs as well as low latency. Thus, for example, a URLLC UE (or URLLC application on a UE) may require much shorter latency, as compared to a eMBB UE (or an eMBB application running on a UE).

The various example implementations may be applied to a wide variety of wireless technologies or wireless networks, such as LTE, LTE-A, 5G, IoT, MTC, eMTC, eMBB, URLLC, etc., or any other wireless network or wireless technology. These example networks, technologies or data service types are provided only as illustrative examples.

Multiple Input, Multiple Output (MIMO) may refer to a technique for increasing the capacity of a radio link using multiple transmit and receive antennas to exploit multipath propagation. MIMO may include the use of multiple antennas at the transmitter and/or the receiver. MIMO may include a multi-dimensional approach that transmits and receives two or more unique data streams through one radio channel. For example, MIMO may refer to a technique for sending and receiving more than one data signal simultaneously over the same radio channel by exploiting multipath propagation. According to an illustrative example, multi-user multiple input, multiple output (multi-user MIMIO, or MU-MIMO) enhances MIMO technology by allowing a base station (BS) or other wireless node to simultaneously transmit or receive multiple streams to different user devices or UEs, which may include simultaneously transmitting a first stream to a first UE, and a second stream to a second UE, via a same (or common or shared) set of physical resource blocks (PRBs)(e.g., where each PRB may include a set of time-frequency resources).

Also, a BS may use precoding to transmit data to a UE (based on a precoder matrix or precoder vector for the UE). For example, a UE may receive reference signals or pilot signals, and may determine a quantized version of a DL channel estimate, and then provide the BS with an indication of the quantized DL channel estimate. The BS may determine a precoder matrix based on the quantized channel estimate, where the precoder matrix may be used to focus or direct transmitted signal energy in the best channel direction for the UE. Also, each UE may use a decoder matrix may be determined, e.g., where the UE may receive reference signals from the BS, determine a charnel estimate of the DL channel, and then determine a decoder matrix for the DL channel based on the DL channel estimate. For example, a precoder matrix may indicate antenna weights (e.g., an amplitude/gain and phase for each weight) to be applied to an antenna array of a transmitting wireless device. Likewise, a decoder matrix may indicate antenna weights (e.g., an amplitude/gain and phase for each weight) to be applied to an antenna array of a receiving wireless device. This applies to UL as well when a UE is transmitting data to a BS.

For example, according to an example aspect, a receiving wireless user device may determine a precoder matrix using Interference Rejection Combining (IRC) in which the user device may receive reference signals (or other signals) from a number of BSs (e.g., and may measure a signal strength, signal power, or other signal parameter for a signal received from each BS), and may generate a decoder matrix that may suppress or reduce signals from one or more interferers (or interfering cells or BSs), e.g., by providing a null (or very low antenna gain) in the direction of the interfering signal, in order to increase a signal-to interference plus noise ratio (SINR) of a desired signal. In order to reduce the overall interference from a number of different interferers, a receiver may use, for example, a Linear Minimum Mean Square Error Interference Rejection Combining (LMMSE-IRC) receiver to determine a decoding matrix. The IRC receiver and LMMSE-IRC receiver are merely examples, and other types of receivers or techniques may be used to determine a decoder matrix. After the decoder matrix has been determined, the receiving UE/user device may apply antenna weights (e.g., each antenna weight including amplitude and phase) to a plurality of antennas at the receiving UE or device based on the decoder matrix. Similarly, a precoder matrix may include antenna weights that may be applied to antennas of a transmitting wireless device or node. This applies to a receiving BS as well.

Several problems/issues may be encountered when high altitude platforms (HAPs) or satellites (e.g., low earth orbit (LEO), medium earth orbit (MEO), geostationary equatorial orbit (GEO) satellites) are used to provide 5G/NR services. For example, in one scenario, large propagation (e.g., signaling) latencies (e.g., delays) are experienced between satellite based radio access network (e.g., satellite based gNB, satellite gNB, satellite cell, etc.) and UEs due to large distances between the satellite and the UEs. Moreover, in bent-pipe configurations, the latencies on links between the satellite and ground stations further increase the latencies/delays. The increased latencies/delays can lead to delayed feedback from the UEs and thereby affecting performance and/or reliability of 5G/NR services being provided. In another example scenario, large distances between the satellite and UEs result in large path loss leading to communications at low signal power levels and/or noise limited radio conditions, which may be similar to operations at cell-edge radio conditions in very large cells in terrestrial networks. In another additional example scenario, relative velocities of UE and/or satellite (e.g., LEO satellites move with orbital velocities of ~27,000 kilometers/hour) further affects the performance and/or reliability of 5G/NR services being provided.

The large propagation delays/latencies, extreme path loss values, and/or relative velocities can increase probability of handover and/or radio link failure due to rapidly deteriorating signaling conditions, especially when the serving satellite cell (e.g., serving cell located at a LEO satellite) moves below a certain minimum elevation angle (e.g., vertical angle at ground station antenna from ground station to satellite). Furthermore, the actual impact on radio performance depends on location of the UE relative to the satellite cell (e.g., or orbit of the satellite cell) as the locations of the UE and/or the satellite cell can be time varying because both the UE and the satellite cell (e.g., the satellite cell moves relative to the UE in the case of LEO/MEO satellites) can move. For example, a UE can move with a velocity of 1,000 kilometers/hour and/or the satellite cell can move with an orbital velocity of 27,000 kilometers/hour.

Therefore, there is a desire/need to avoid long handover procedure times (e.g., radio measurements, handover preparation, handover execution times, etc.) during a radio handover to a new satellite cell to reduce the risk of handover failures taking into consideration the low signal levels at which these cell changes happen. The solutions developed to reduce handover times in terrestrial networks (e.g., make-before-break, conditional handover, dual-connectivity based handover, etc.) do not efficiently address the problems and/or do not apply for NTN scenarios due largely different radio propagation conditions, higher relative velocities of satellite based source cell and/or target cell(s), and large differences between the signals received at the UE which are based UE's relative location with respect to the source and target cell(s).

Figure 2:
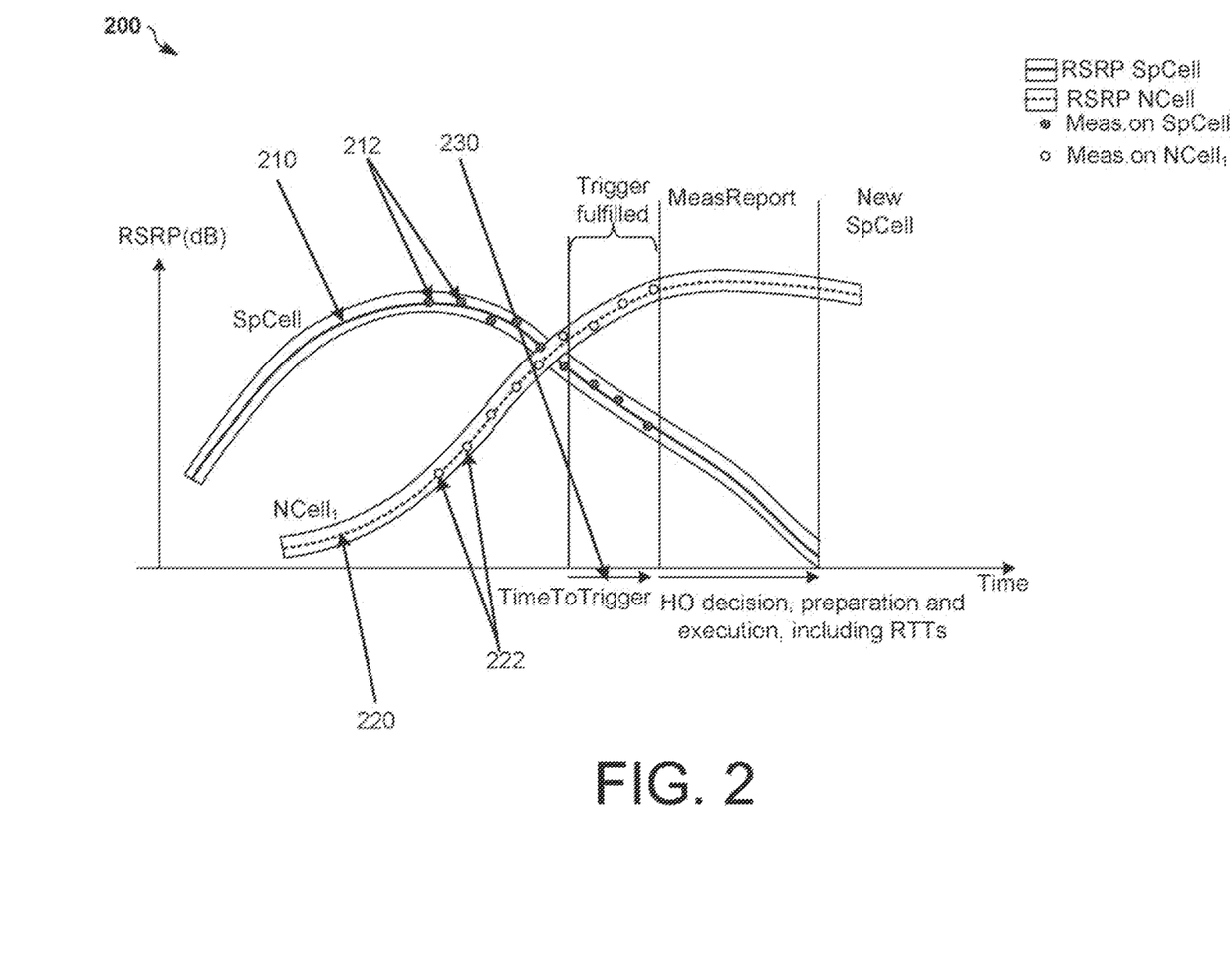
FIG. 2 is a graph illustrating an example mobility measurements and handover event trigger mechanism in 5G/NR.

FIG. 2 is a graph 200 illustrating an example mobility measurements and handover event trigger mechanism in 5G/NR.

In FIG. 2, 210 represents reference signal measurements of a serving cell (e.g., serving primary cell (SpCell) and 220 represents reference signal measurements of a neighbor cell (e.g., NCell$_1$) of a plurality of neighbor cells. The reference signal measurements may be reference signal received power (RSRP) or reference signal received quality (RSRQ) measurements. In some instances, the serving cell and the neighbor cells may be satellite cells.

In an example scenario, 212 nm represent RSRP measurements of the serving cell and 222 may represent RSRP measurements of the neighbor cell (e.g., NCell$_1$), at specific instances of time. As shown in FIG. 2, when trigger conditions configured at a UE we fulfilled (e.g., satisfied) for "timeToTrigger" time duration 230, the UE may report the event to the serving cell and the network may initiate a handover procedure to a neighbor cell (e.g., NCell$_1$), for example, as described in 5G NR Specification TS 38.331.

However, due to large propagation latencies (e.g., as described above), the UE may experience large delays prior to the handover execution to a target cell (e.g., NCell$_1$) is complete. During this time period, the channel conditions at the UE can change rapidly, especially for a satellite (e.g., LEO satellite) based target cells where the satellite may be moving at very high orbital velocities and the angle of elevation is below the minimum acceptable elevation angle. Moreover, as the shape of curves 210 and/or 220 depend on antenna patterns and relative movement of the satellite cells (e.g., serving and neighbor cells which may be satellite based) and the UEs, different UEs could perceive the cells with different RSRP measurements as the rate of change of the RSRP measurements depends on UEs' location on Earth with respect to the coverage areas of the satellites. In other words, same/similar configuration values for radio measurements and mobility events for two UEs at different locations may lead to very different outcomes, e.g., successful handover vs an unsuccessful handover.

A method, apparatus, and a computer-readable storage medium are provided for proactive triggering of handovers in wireless communication networks. In one example implementation, the method may include receiving, by a user equipment (UE), handover configuration information from a first network node of a plurality of network nodes, estimating rate of change values of reference signal (RS) difference measurements, a reference signal (RS) difference measurement being a difference in reference signal (RS) measurements between the first network node and a second network node of one or more second network nodes, comparing the rate of change values with the mapping information received from the first network node, determining one or more timeToPreTrigger values based on the comparison, initiating one or more timeToPreTrigger timers based on the corresponding one or more timeToPreTrigger values, the one or more timeToPreTrigger timers corresponding to different second network nodes, generating one or more measurement reports upon expiration of the one or more timeToPreTrigger timers, and transmitting the one or more measurement reports to the first network node. In an another example implementation, the method may include transmitting, by a first network node of a plurality of network nodes, handover configuration information to a user equipment (UE), receiving a measurement report from the user equipment (UE), the measurement report corresponding to at least one second network node of the one or more second network nodes, selecting, based on the measurement report, a second network node of the one or more second network nodes for performing a handover, and transmitting an indication to the user equipment (UE) about performing the handover to the selected second network node based on the indication.

Figure 3:
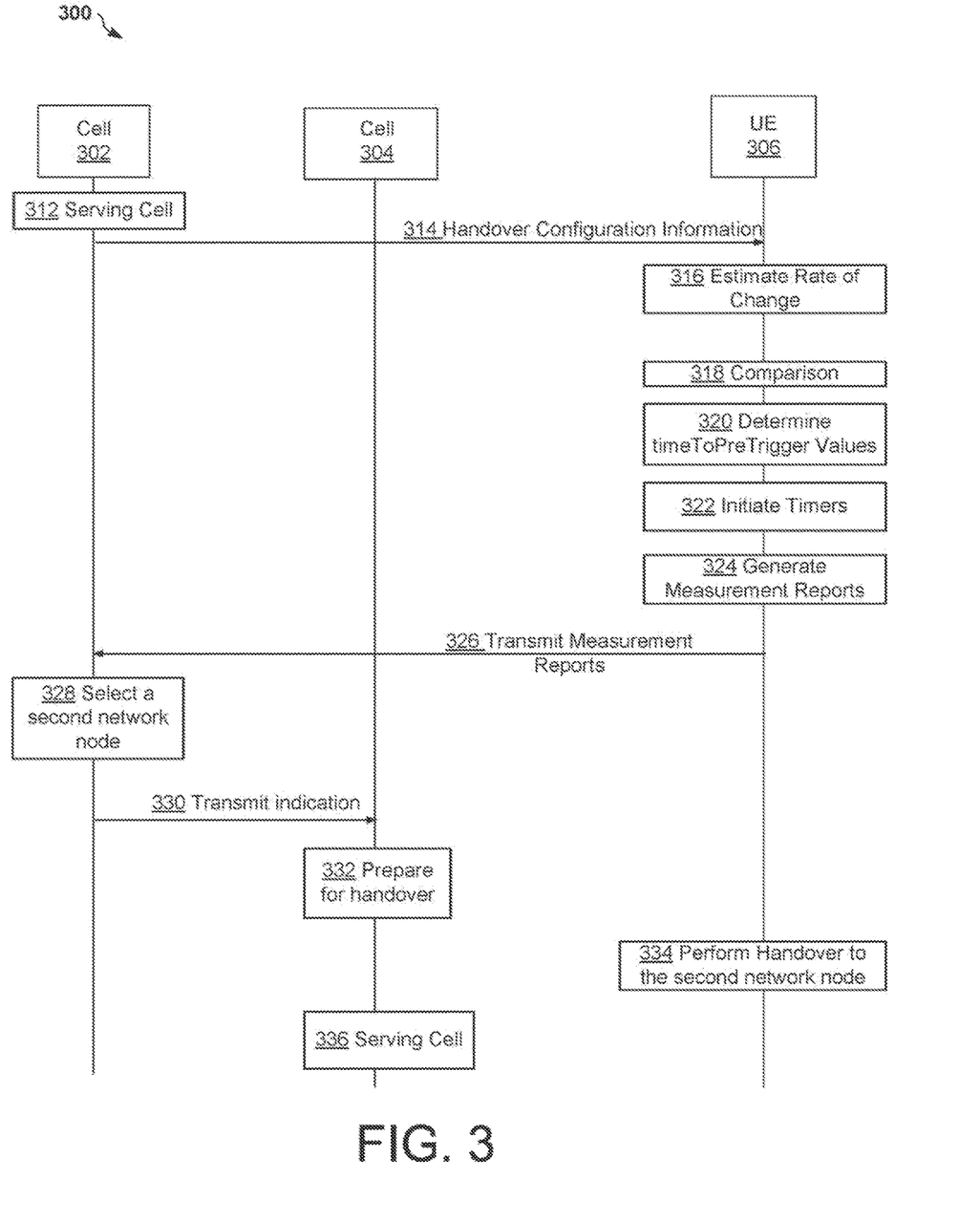
FIG. 3 is a flow diagram illustrating a mechanism configured with a pre-trigger event, according to an example implementation.

FIG. 3 is a flow diagram 300 illustrating a proposed mechanism configured with a pre-trigger event, according to an example implementation. In some implementations, for example, the proposed mechanism may include a pre-trigger event configured as a condition which may be based on differences (or rate of change of differences) in reference signal measurements between a serving cell and one or more neighbor cells.

In some implementations, FIG. 3 illustrates a UE 306, a serving cell 302 (also referred as serving primary cell (SpCell), first network node, or cell 302), and/or a neighbor cell 304 of a plurality of neighbor cells (also referred to as a second network node or cell 304). Although only one neighbor cell is illustrated in FIG. 3, UE 306 may measure reference signal measurements of a plurality of neighbor cells.

At 312, UE 306 is camped on serving cell 302 (e.g., cell 302 is the serving cell of UE 306). At 314, serving cell 302 may transmit (or send) handover configuration information. In some implementations, for example, serving cell 302 may broadcast or multicast handover configuration information via a radio resource control (RRC) connection reconfiguration or RRC connection release message. In an example implementation, handover configuration information may include mapping information for performing mapping between rate of change values and timeToPreTrigger values. In other words, the mapping information maps rate of change values to timeToPreTrigger values. In some implementations, the handover configuration information may also contain (or include) one more rules associated with radio access prioritization of one or more neighbor cells. The one or more rules provide information to prioritize neighbor cells for performing a handover.

In some implementations, the mapping information and/or the one or more rules may be determined by serving cell 302 or a core network entity. In an example implementation, serving cell 302 or a core network entity may determine the mapping information and/or the one or more rules based on satellite constellation configuration information and/or satellite ephemeris data.

At 316, UE 306 may monitor and/or estimate reference signal difference measurements and/or rate of change values of reference signal difference measurements. In some implementations, for example, the reference signal difference measurement (e.g., RSRP-diffX) may be defined as a difference (in values) between reference signal measurements of serving cell 302 and neighbor cell 304. In another example implementation, reference signal difference measurement may be a difference between reference signal measurements of serving cell 302 and another neighbor cell, and so on, which may be denoted by, for example:

$$RSRP - diffX = RSRP\_SpCell - RSRP\_NCellX[dB],$$

where X=1, 2, . . . , N, and represents the index of neighbouring cells.

Figure 4:
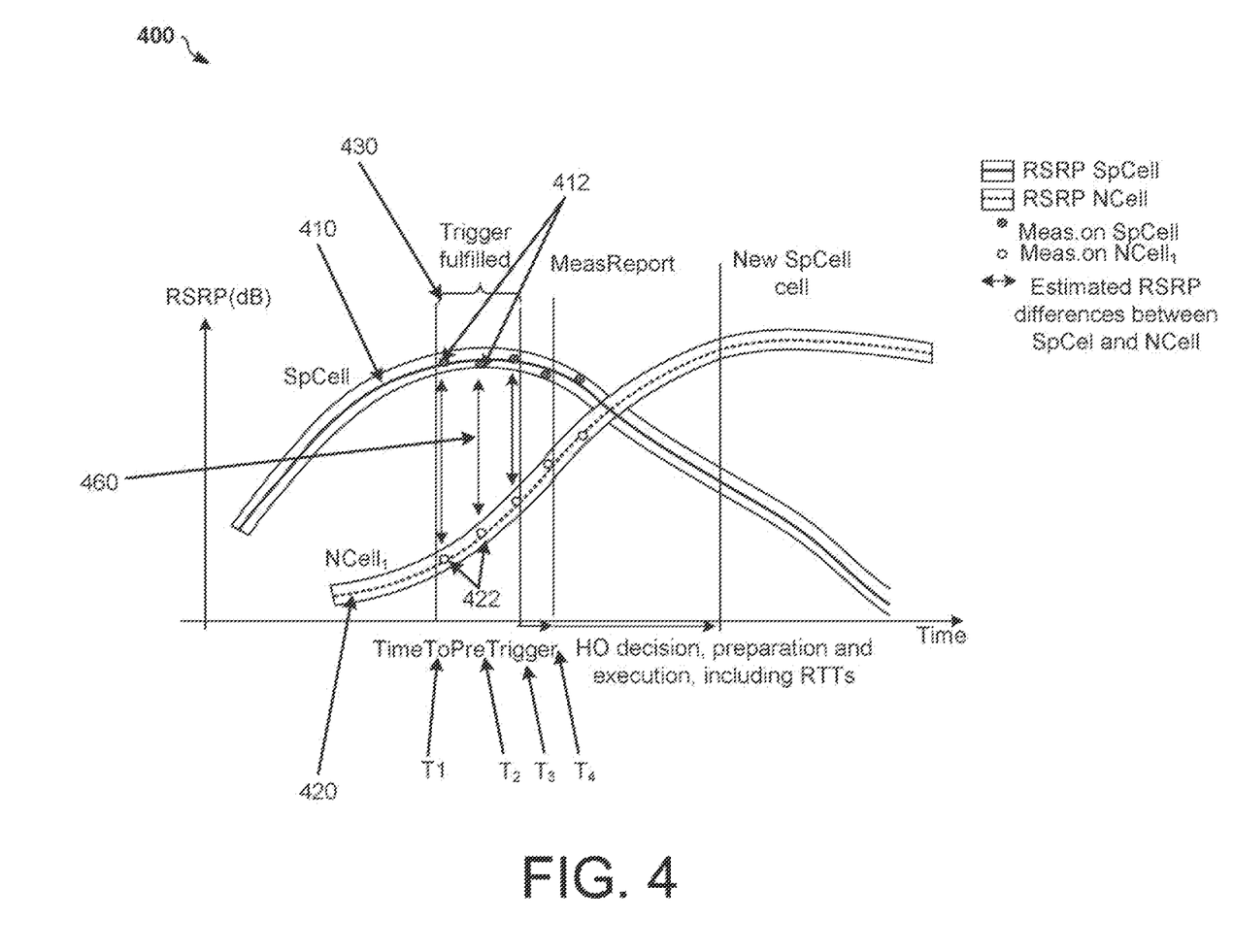
FIG. 4 is a graph illustrating an example pre-trigger mechanism, according to an example implementation.

In some implementations, the rate of change (or rate of change values) of reference signal difference measurements may be defined as reference signal difference measurements over a unit of time (e.g., RSRP-diffX/($T_2-T_1$)), as shown in FIG. 4. In an example implementation, the rate of change may change over time (e.g., as a function of time). In some implementations, for example, UE 306 may perform the estimating with a certain time periodicity and/or during a pre-defined measurement time period. In some implementations, UE may estimate the rate of change as a gradient as defined in R2-132597.

At 318, UE 306 may compare reference signal different measurements or the rate of change of reference signal different measurements (or gradient of reference signal difference measurements) with the mapping information received from serving cell 302 via handover configuration information. In other words, the rate of change of reference signal difference measurements is compared with the mapping information to identify the closest match (e.g., closest match of rate of change) in the mapping information, so that, at 320, UE 306 may determine the corresponding timeToPreTrigger values based on the closest match present in the mapping information.

In some implementations, for example, UE 306 may determine the best possible match based on a certain accuracy level (e.g., number/fraction of estimates that are within an error margin compared to the mapping curves) which may be configured by the network (or a default value may be used) and a certain match rate (e.g., configured by the network or default) with the fixed pre-trigger time window. In some implementations, for example, the prioritization of a neighbor cell X where X=1, 2, . . . , N may be implemented in this step, for example, prioritization of neighbor cells based on the corresponding timeToPreTrigger values. In some implementations, for example, the rate of change may be a non-constant rate change (e.g., a second derivative instead of a first derivative) which may be compared to a pattern to trigger a handover. In such an example implementation, the trigger may be such that the comparison needs to fulfill a certain quality/accuracy before the measurement report is sent.

At 322, upon finding a match in the mapping information at 320, in some implementations, UE 306 may initiate (e.g., start) timeToPreTigger timers as shown at T3 of FIG. 4. Alternatively, in some implementations, if UE 306 fails to identify a match at 320, UE 306 may continue with the monitoring and/or estimating of reference signal difference measurements. In some implementations, for example, UE 306 may initiate a plurality of timeToPreTrigger timers corresponding to different neighbor cells. The different neighbor cells may be based on the outcome of a (second) prioritization condition/rule. For example, a neighbor cell (NCell) with PCIs in a given pre-defined list may have higher priority as target cells for handover compared to other NCells. In some implementations, for example, the pre-defined list may contain PCIs for cells which am from satellites on the same orbit as the SpCell.

At 324, upon expiration of the timeToPreTrigger timer, e.g., at T4 of FIG. 4, UE 306 may generate a measurement report. In some implementations, the measurement report generated by UE 306 may be radio measurements related to the serving cell and at least one neighbor cell. For example, in some implementations, a measurement report may include absolute RSRP_SpCell and RSRP_NCellX measurements, RSRP_SpCell and RSRP-diffX measurements, or RSRP_SpCell and timeToPreTrigger timer value, etc.

In some implementations, if a plurality of timeToPreTrigger timers have been initiated as described above at 322, one measurement report can be generated for each neighbor cell or one measurement report that includes information for the plurality of neighbor cells may be generated. This approach can assist the serving cell to prepare several neighbor cells as potential target cells for the handover (e.g., conditional handover scenarios). In addition, in some implementations, for example, a measurement report may include cell identifier(s) and corresponding timeToPreTrigger values of one or more neighbor cells.

At 326, UE 306 may transmit the generated measurement report(s) to serving cell 302. In some implementations. UE 306 may transmit one combined or more measurement reports corresponding to one or more neighbor cells.

At 328, upon receiving the one or more measurement reports, in some implementations, for example, serving cell 302 may use the one or more measurement reports to select a neighbor cell, for example, cell 304 for handover of UE 306 from serving cell 302 to neighbor cell 304. At 330, in some implementation, serving cell 302 may send an indication to neighbor cell 304 to prepare for handover of UE 306.

At 332, in some implementations, neighbor cell 304 prepares for handover of UE 306, and at 334, UE performs the handover. Upon successful completion of the handover to neighbor cell 304, neighbor cell 304 becomes the new serving cell of UE 306 at 336.

Thus, the above described mechanism initiates a handover earlier than it is generally performed (e.g., as described in FIG. 2). The early handover ensures that UE 306 is handed over to cell 304 before the signal of the serving cell 302 drops significantly. The benefits/advantages of the above described mechanism include, for example, earlier availability of measurement reports at the serving cell (and/or earlier triggering of handovers) to perform better handover decisions, minimizing handover failures resulting from significant signal degradation of the serving cell during the handover process, ability to use as a condition/trigger for conditional handovers (including prioritization of target cells), reliance on knowledge on the network side of the satellite constellation ephemeris data to configure the pre-trigger event (and thereby avoiding the need to rely on the use of precise UE location/movement information (GNSS-based or 3GPP localization)), and/or the ability to pre-define mapping curves (e.g., FIG. 4) on geo-area basis, and/or updating periodically using local information on propagation conditions, e.g., rain, NR cell beam reconfiguration, satellite failures, etc.

In some implementations, the serving cell may update or switch the mapping information and/or the set of rules at the UE. For example, serving cell 302 may update the mapping information and/or set of rules at UE 306 via radio resource control (RRC) or media access control (MAC) signaling. In addition, in some implementations, the mapping information and/or set of rules may be switched, for example, from first mapping information and/or first set of rules to a second mapping information and/or second set of rules at the UE via radio resource control (RRC) or media access control (MAC) signaling. The updating/switching of the mapping information and/or the set of rules at the UE provides for flexibility to periodically update (or as needed) the mapping information and/or the set of rules using, for example, local information on propagation conditions, e.g., rain. NR cell beam reconfiguration, satellite failures, etc.

FIG. 4 is a graph 400 illustrating an example pre-trigger mechanism, according to an example implementation.

In FIG. 4, 410 represents reference signal measurements of a serving cell, SpCell, e.g., cell 302, and 420 represents reference signal measurements of a neighbor cell, NCell$_1$, e.g., cell 304. In some implementations, 412 may represent reference signal measurements of serving cell 302 and 422 may represent reference signal measurements of neighbor cell 304 at various instances in time. In addition. 460 may represent differences in reference signal measurements of the serving cell and neighbor cell, at various instances in time.

In some implementations, for example, 430 represents a PreTrigger window (or PreTrigger time duration) which may be configured by network or a default value may be used. During the PreTrigger window 430, UE 306 may monitor/estimate reference signal measurements and compare the estimated measurements with the mapping information received from serving cell 302 via handover configuration information to determine whether a match exists as described above at 320. In some implementations, for example, PreTrigger window 430 may be a time sliding window, e.g., UE 306 may use radio measurements (e.g., reference signal measurements) from previous PreTrigger window time durations to estimate the match to the mapping information.

As shown in FIG. 4, when PreTrigger conditions configured at the UE are fulfilled (e.g., satisfied) for PreTrigger time duration 430, the UE may initiate a timeToPreTrigger at T3 (as described above at 322) and further generate a measurement report at T4 (as described above at 324).

Figure 5A:
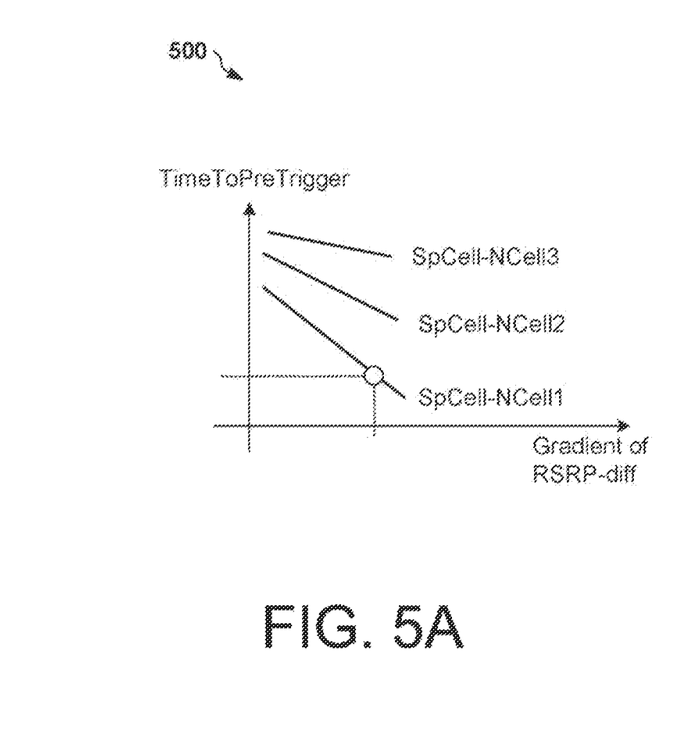
FIG. 5A illustrates a graph for mapping of rate of change values and timeToPreTrigger values, according to at least an example implementation.

FIG. 5A illustrates a graph 500 for proposed mapping of rate of change values and timeToPreTrigger values, according to at least an example implementation.

In some implementations, for example, 500 illustrates a graph for mapping RSRP-diff rate of change values and timeToPreTrigger values separately for each of serving and neighbor cells pairs, e.g., SpCell-NCell$_1$, SpCell-NCell$_2$, SpCell-NCell$_3$, etc.

Figure 5B:
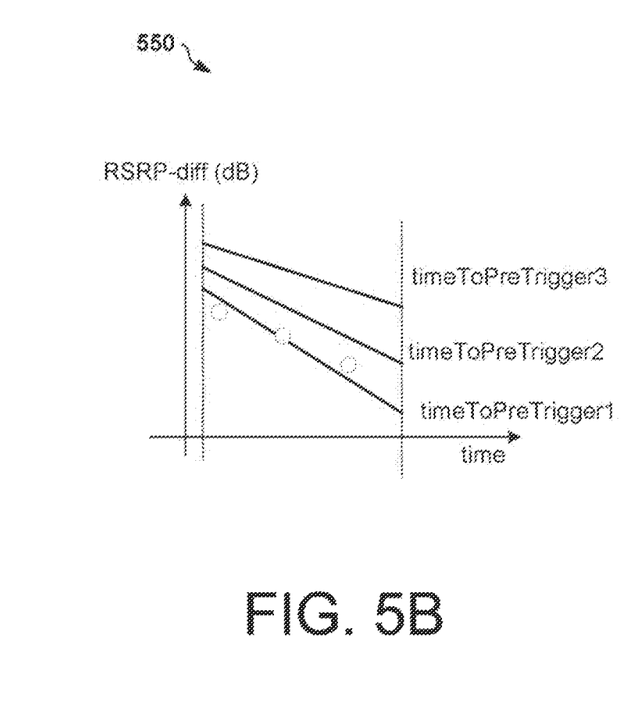
FIG. 5B illustrates a graph for mapping of rate of change values and timeToPreTrigger values, according to at least an additional example implementation.

FIG. 5B illustrates a graph 550 for proposed mapping of consecutive RSRP-diff values and timeToPreTrigger values, according to at least an additional example implementation.

In some implementations, for example, 550 illustrates a graph for mapping rate of change values and timeToPreTrigger values that may apply for any pair of serving and neighbor cells, e.g., any pair of SpCell-NCell$_X$. For example, the timeToPreTrigger values may be determined based on the value of the rate of change and the SpCell-NCellX pair in the graph.

Figure 6:
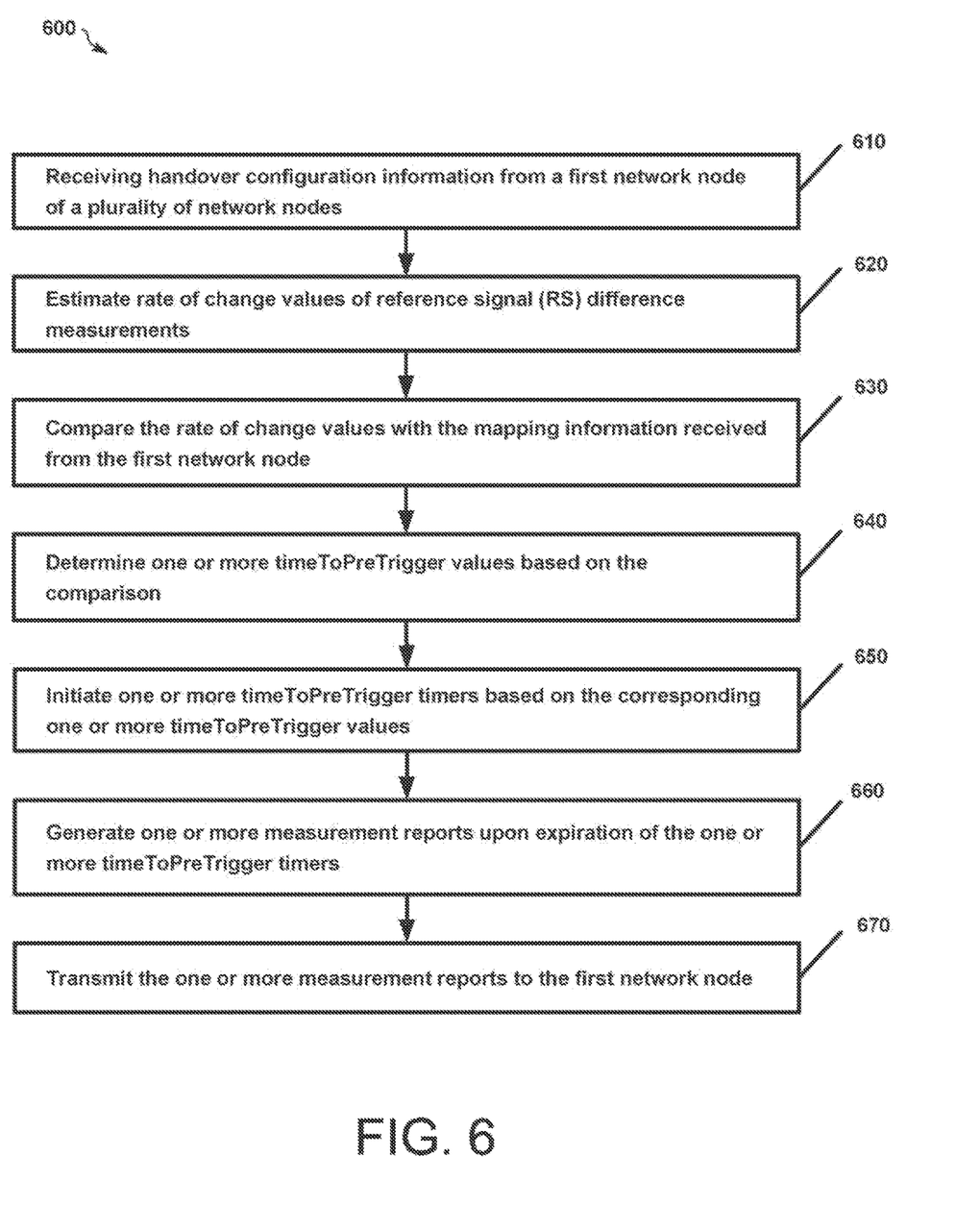
FIG. 6 is a flow chart illustrating transmitting of measurement reports from a user equipment (UE), according to at least one example implementation.

FIG. 6 is a flow chart 600 illustrating transmitting of measurement reports from a user equipment (UE), for example, from UE 306, according to at least one example implementation.

At block 610, the UE may receive handover configuration information from a first network node of a plurality of network nodes. In some implementations, for example, UE 306 may receive handover configuration information from the first network node, e.g., serving cell 302. In some implementations, handover configuration information may include mapping information and/or one or more rules associated with prioritization of neighbor cells.

At block 620, the UE may estimate rate of change values of reference signal (RS) difference measurements. In some implementations, for example, UE 306 may estimate rate of change of reference signal (RS) difference measurements between serving cell 302 and neighbor cell 304.

At block 630, the UE may compare the rate of change values with the mapping information received from the first network node. In some implementations, for example, UE 306 may compare the rate of change values estimated at block 620 with the mapping information received at block 610 from serving cell 302.

At block 640, the UE may determine one or more time-ToPreTrigger values based on the comparison. In some implementations, for example, UE 306 may determine time-ToPreTrigger values based on the comparison.

At block 650, in some implementations, for example, UE 306 may initiate one or more timeToPreTrigger timers based on the corresponding one or more timeToPreTrigger values, the one or more timeToPreTrigger timers corresponding to different second network nodes.

At block 660, the UE may generate one or more measurement reports upon expiration of the one or more timeToPreTrigger timers. In some implementations, for example, UE 306 may generate one or more measurement reports upon expiration of the one or more timeToPreTrigger timers. At block 670, in some implementations. UE 306 may transmit one or more measurement reports to the first network node, e.g., serving cell 302.

Additional example implementations are described herein.

Example 1. A method of communications, comprising: receiving, by a user equipment (UE), handover configuration information from a first network node of a plurality of network nodes, the first network node being a serving cell of the user equipment (UE), and the handover configuration information including at least mapping information; estimating, by the user equipment (UE), rate of change values of reference signal (RS) difference measurements, a reference signal (RS) difference measurement being a difference in reference signal (RS) measurements between the first network node and a second network node of one or more second network nodes, the one or more second network nodes of the plurality of network nodes being neighbor cells; comparing, by the user equipment (UE), the rate of change values with the mapping information received from the first network node; determining, by the user equipment (UE), one or more timeToPreTrigger values based on the comparison; initiating, by the user equipment (UE), one or more timeToPreTrigger timers based on the corresponding one or more timeToPreTrigger values, the one or more timeToPreTrigger timers corresponding to different second network nodes; generating, by the user equipment (UE), one or more measurement reports upon expiration of the one or more timeToPreTrigger timers; and transmitting, by the user equipment (UE), the one or more measurement reports to the first network node.

Example 2. The method of Example 1, further comprising: receiving, by the user equipment (UE), an indication from the first network node about a second network node of the one or more second network nodes for performing a handover, the indication determined based at least on the one or more measurement reports, and performing, by the user equipment (UE), the handover from the first network node to the second network node based on the indication received from the first network node.

Example 3. The method of any of Examples 1-2, wherein a measurement report of the one or more measurement reports includes cell identifiers and corresponding timeToPreTrigger values of the one or more second network nodes.

Example 4. The method of any of Examples 1-3, wherein the handover configuration information is received, via broadcasting or multicasting from the first network node, using radio resource control (RRC) connection reconfiguration or radio resource control (RRC) connection release messages.

Example 5. The method of any of Examples 1-4, wherein the mapping information maps the rate of change values to the timeToPreTrigger values.

Example 6. The method of any of Examples 1-5, wherein the mapping information maps the rate of change values to the timeToPreTrigger values, and wherein the mapping information is associated with serving cell-neighbor cell combinations.

Example 7. The method of any of Examples 1-6, wherein the mapping information maps the reference signal difference measurements to the timeToPreTrigger values.

Example 8. The method of any of Examples 1-7, wherein the handover configuration information further includes: one or more rules associated with radio access prioritization of the one or more second network nodes for performing the handover.

Example 9. The method of any of Examples 1-8, wherein the mapping information is first mapping information and the one or more rules include first set of rules, and further comprising: switching to and/or activating of second mapping information and/or second set of rules via radio resource control (RRC) or media access control (MAC) signaling.

Example 10. The method of any of Examples 1-9, wherein the mapping information and the one or more rules are determined by a core network entity.

Example 11. The method of any of Examples 1-10, wherein the estimating is performed with a time periodicity and/or during a pre-defined measurement time period.

Example 12. The method of any of Examples 1-11, wherein the comparing identifies a corresponding timeToPreTigger value based on finding a closest match in the mapping information.

Example 13. The method of any of Examples 1-12, wherein the reference signal (RS) difference measurements include differences in reference signal received power (RSRP) and/or reference signal received quality (RSRQ) values of the first network node and the one or more second network nodes.

Example 14. The method of any of Examples 1-13, wherein the first network node is a source cell and the second network node is a target cell.

Example 15. The method of any of Examples 1-14, wherein the plurality of network nodes are non-terrestrial network (NTN) nodes.

Example 16. The method of any of Examples 1-15, wherein the mapping information maps rate of change values of reference signal (RS) difference measurements and timeToPreTrigger values and/or one or more rules associated with radio access prioritization of one or more second network nodes of the plurality of network nodes, a reference signal (RS) difference measurement being a difference in reference signal (RS) measurements between the first network node and a second network node of one or more second network nodes.

Example 17. The method of any of Examples 1-16, wherein the estimating includes estimating the rate of change values as a function of time.

Example 18. The method of any of Examples 1-17, wherein a measurement report of the one or more measurement reports is generated based on a first accuracy level and/or a first match rate indicated in the mapping information, and wherein the measurement report includes a second accuracy level and/or a second match rate associated with the generated measurement report.

Example 19. An apparatus, comprising: at least one processor; and at least one memory including computer program code; the at least one memory and the computer program code configured to, with the at least one processor, cause the apparatus to receive, by a user equipment (UE), handover configuration information from a first network node of a plurality of network nodes, the first network node being a serving cell of the user equipment (UE), and the handover configuration information including at least mapping information; estimate, by the user equipment (UE), rate of change values of reference signal (RS) difference measurements, a reference signal (RS) difference measurement being a difference in reference signal (RS) measurements between the first network node and a second network node of one or more second network nodes, the one or more second network nodes of the plurality of network nodes being neighbor cells; compare, by the user equipment (UE), the rate of change values with the mapping information received from the first network node; determine, by the user equipment (UE), one or more timeToPreTrigger values based on the comparison; initiate, by the user equipment (UE), one or more timeToPreTrigger timers based on the corresponding one or more timeToPreTrigger values, the one or more timeToPreTrigger timers corresponding to different second network nodes; generate, by the user equipment (UE), one or more measurement reports upon expiration of the one or more timeToPreTrigger timers; and transmit, by the user equipment (UE), the one or more measurement reports to the first network node.

Example 20. The apparatus of Example 19, further causing the apparatus to: receive, by the user equipment (UE), an indication from the first network node about a second network node of the one or more second network nodes for performing a handover, the indication determined based at least on the one or more measurement reports; and perform, by the user equipment (UE), the handover from the first network node to the second network node based on the indication received from the first network node.

Example 21. The apparatus of any of Examples 19-20, wherein a measurement report of the one or more measurement reports includes cell identifiers and corresponding timeToPreTrigger values of the one or more second network nodes.

Example 22. The apparatus of any of Examples 19-21, wherein the handover configuration information is received, via a broadcast or multicast from the first network node, using radio resource control (RRC) connection reconfiguration or radio resource control (RRC) connection release messages.

Example 23. The apparatus of any of Examples 19-22, wherein the mapping information maps the rate of change values to the timeToPreTrigger values.

Example 24. The apparatus of any of Examples 19-23, wherein the mapping information maps the rate of change values to the timeToPreTrigger values, and wherein the mapping information is associated with serving cell-neighbor cell combinations.

Example 25. The apparatus of any of Examples 19-24, wherein the mapping information maps the reference signal difference measurements to the timeToPreTrigger values.

Example 26. The apparatus of any of Examples 19-25, wherein the handover configuration information further includes: one or more rules associated with radio access prioritization of the one or more second network nodes for performing the handover.

Example 27. The apparatus of any of Examples 19-26, wherein the mapping information is first mapping information and the one or more rules include first set of rules, and further causing the apparatus to: switch to and/or activate of second mapping information and/or second set of rules via radio resource control (RRC) or media access control (MAC) signaling.

Example 28. The apparatus of any of Examples 19-27, wherein the mapping information and the one or more rules are determined by a core network entity.

Example 29. The apparatus of an of Examples 19-28, wherein the estimation is performed with a time periodicity and/or during a pre-defined measurement time period.

Example 30. The apparatus of any of Examples 19-29, wherein the comparison identifies a corresponding timeToPreTigger value based on finding a closest match in the mapping information.

Example 31. The apparatus of any of Examples 19-30, wherein the reference signal (RS) difference measurements include differences in reference signal received power (RSRP) and/or reference signal received quality (RSRQ) values of the first network node and the one or more second network nodes.

Example 32. The apparatus of any of Examples 19-31, wherein the first network node is a source cell and the second network node is a target cell.

Example 33. The apparatus of my of Examples 19-32, wherein the plurality of network nodes are non-terrestrial network (NTN) nodes.

Example 34. The apparatus of any of Examples 19-33, wherein the mapping information maps rate of change values of reference signal (RS) difference measurements and timeToPreTrigger values and/or one or more rules associated with radio access prioritization of one or more second network nodes of the plurality of network nodes, a reference signal (RS) difference measurement being a difference in reference signal (RS) measurements between the first network node and a second network node of one or more second network nodes.

Example 35. The apparatus of any of Examples 19-34, wherein the estimate includes estimate the rate of change values as a function of time.

Example 36. The apparatus of any of Examples 19-35, wherein a measurement report of the one or more measurement reports is generated based on a first accuracy level and/or a first match rate indicated in the mapping information, and wherein the measurement report includes a second accuracy level and/or a second match rate associated with the generated measurement report.

Example 37. An apparatus comprising means for performing a method of ay of Examples 1-18.

Example 38. A non-transitory computer-readable storage medium having stored thereon computer executable program code which, when executed on a computer system, causes the computer system to perform the steps of any of Examples 1-18.

Figure 7:
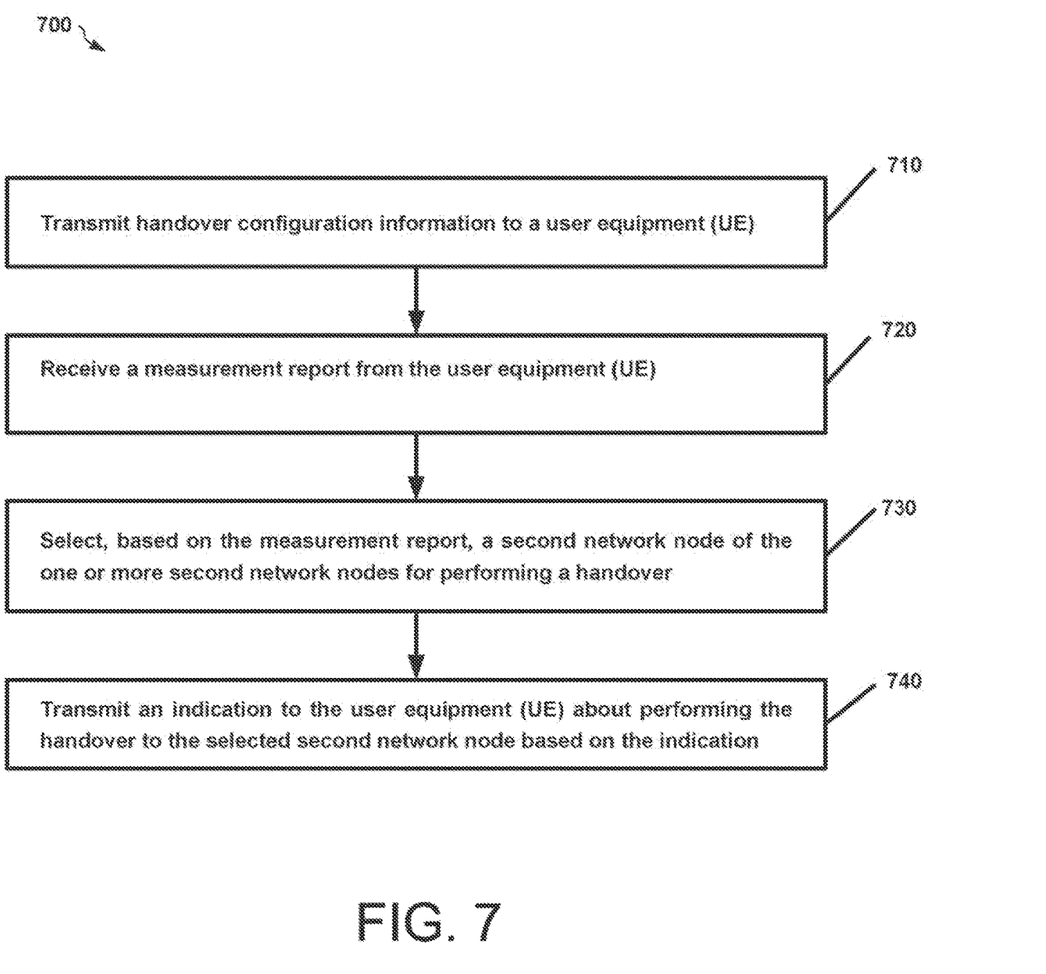
FIG. 7 is a flowchart illustrating transmitting an indication to a user equipment about a handover, according to an example implementation.

FIG. 7 is a flowchart 700 illustrating transmitting an indication to a user equipment about a handover, according to an example implementation.

At block 710, a first network node (e.g., serving cell 302) may transmit handover configuration information to UE 306. In some implementations, for example, handover configuration information includes mapping information and/or set of rules for prioritization of the neighbor cells.

At block 720, the first network node (e.g., serving cell 302) ma receive a measurement report from UE 306. In some implementations, the measurement report may correspond to at least one second network node (e.g., neighbor cell 304).

At block 730, the first network node (e.g., serving cell 302) may select a second network node (e.g., neighbor cell 304) for performing a handover. In some implementations, for example, the selection may be based on the measurement report received from UE 306.

At block 740, the first network node (e.g., serving cell 302) may transmit an indication to UE 306 about performing the handover to the selected second network node (e.g., neighbor cell 304) based on the indication.

Additional example implementations are described herein.

Example 39. A method of communications, comprising: transmitting, by a first network node of a plurality of network nodes, handover configuration information to a user equipment (UE), the handover configuration information includes: mapping information between rate of change values of reference signal (RS) difference measurements and timeToPreTrigger values and/or one or more rules associated with radio access prioritization of one or more second network nodes of the plurality of network nodes, a reference signal (RS) difference measurement being a difference in reference signal (RS) measurements between the first network node and a second network node of one or more second network nodes, and the one or more second network nodes of the plurality of network nodes being neighbor cells; receiving, by the first network node, a measurement report from the user equipment (UE), the measurement report corresponding to at least one second network node of the one or more second network nodes; selecting, by the first network node, based on the measurement report, a second network node of the one or more second network nodes for performing a handover, and transmitting, by the first network node, an indication to the user equipment (UE) about performing the handover to the selected second network node based on the indication.

Example 40. The method of Examples 39, wherein the mapping information is determined at the first network node and/or a core network entity based on satellite constellation configuration information and/or satellite ephemeris data.

Example 41. The method of any of Examples 39-40, wherein the first network node is a serving cell and the second network node is a neighbor cell.

Example 42. The method of any of Examples 39-41, wherein the plurality of network nodes are non-terrestrial network (NTN) nodes.

Example 43. The method of any of Examples 39-42, wherein a measurement report of the one or more measurement reports includes cell identifiers and corresponding timeToPreTrigger values of the one or more second network nodes.

Example 44. An apparatus comprising at least one processor and at least one memory including computer instructions, when executed by the at least one processor, cause the apparatus to perform a method of any of Examples 39-43.

Example 43. An apparatus comprising means for performing a method of any of Examples 39-43.

Example 46. A non-transitory computer-readable storage medium having stored thereon computer executable program code which, when executed on a computer system, causes the computer system to perform the steps of any of Examples 39-43.

Figure 8:
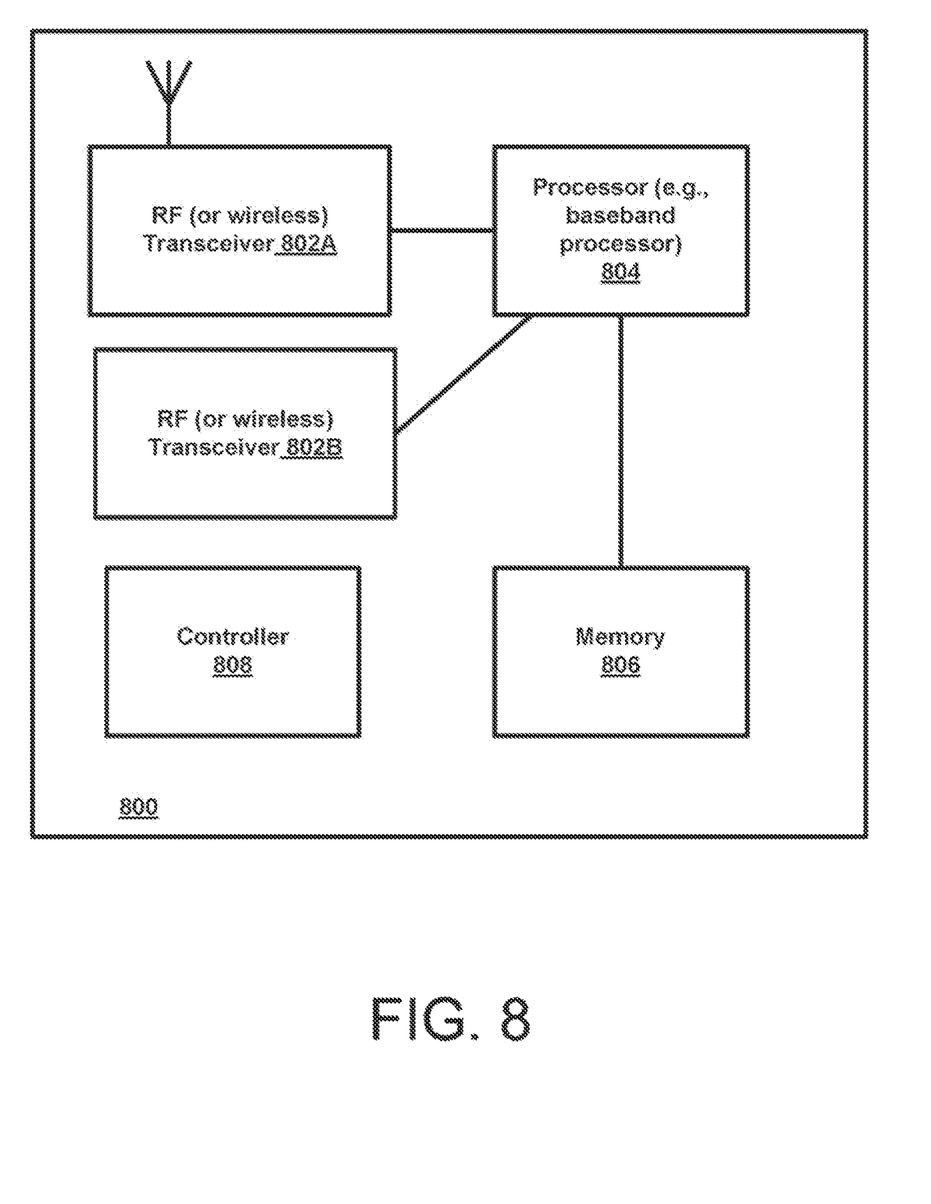
FIG. 8 is a block diagram of anode or wireless station (e.g., base station/access point or mobile station/user device/UE), according to an example implementation.

FIG. 8 is a block diagram of a wireless station (e.g., user equipment (UE)/user device or AP/gNB/MgNB/SgNB) 800 according to an example implementation. The wireless station 800 may include, for example, one or more RF (radio frequency) or wireless transceivers 802A, 802B, where each wireless transceiver includes a transmitter to transmit signals and a receiver to receive signals. The wireless station also includes a processor or control unit/entity (controller) 804/808 to execute instructions or software and control transmission and receptions of signals, and a memory 806 to store data and/or instructions.

Processor 804 may also make decisions or determinations, generate frames, packets or messages for transmission, decode received frames or messages for further processing, and other tasks or functions described herein. Processor 804, which may be a baseband processor, for example, my generate messages, packets, frames or other signals for transmission via wireless transceiver 802 (802A or 802B). Processor 804 may control transmission of signals or messages over a wireless network, and may control the reception of signals or messages, etc., via a wireless network (e.g., after being down-converted by wireless transceiver 802, for example). Processor 804 may be programmable and capable of executing software or other instructions stored in memory or on other computer media to perform the various tasks and functions described above, such as one or more of the tasks or methods described above. Processor 804 may be (or may include), for example, hardware, programmable logic, a programmable processor that executes software or firmware, and/or any combination of these. Using other terminology, processor 804 and transceiver 802 together may be considered as a wireless transmitter/receiver system, for example.

In addition, referring to FIG. 8, a controller (or processor) 808 may execute software and instructions, and may provide overall control for the station 800, and may provide control for other systems not shown in FIG. 8, such as controlling input/output devices (e.g., display, keypad), and/or may execute software for one or more applications that may be provided on wireless station 800, such as, for example, an email program, audio/video applications, a word processor, a Voice over IP application, or other application or software. Moreover, a storage medium may be provided that includes stored instructions, which when executed by a controller or processor may result in the processor 804, or other controller or processor, performing one or more of the functions or tasks described above.

According to another example implementation, RF or wireless transceiver(s) 802A/802B may receive signals or data and/or transmit or send signals or data. Processor 804 (and possibly transceivers 802A/802B) may control the RF or wireless transceiver 802A or 802B to receive, send, broadcast or transmit signals or data.

The aspects are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or w-ireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS)(a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer, chip or chipset. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

What is claimed is:

1. An apparatus, comprising:
   at least one processor; and
   at least one memory including computer program code that causes the at least one processor, when executed thereby, to direct a user equipment (UE) to perform operations that include:
   receive handover configuration information from a first network node of a plurality of network nodes, the first network node being a serving cell of the UE, and the handover configuration information including at least mapping information and one or more rules associated with prioritization of neighbor cells, wherein the plurality of network nodes are non-terrestrial network (NTN) nodes, wherein the handover configuration information is received, via a multicast from the first network node, using radio resource control (RRC) connection reconfiguration or RRC connection release messages, wherein the mapping information maps a rate of change values to timeToPreTrigger values, and wherein the mapping information is associated with serving cell-neighbor cell combinations, and wherein the mapping information and the one or more rules are based on satellite constellation configuration information and satellite ephemeris data;
   estimate rate of change values of reference signal (RS) difference measurements, a reference signal difference measurement being a difference in reference signal measurements between the first network node and a second network node of one or more second network nodes, the one or more second network nodes of the plurality of network nodes being neighbor cells, wherein the reference signal difference measurements include differences in reference signal received power (RSRP) and/or reference signal received quality (RSRQ) values of the first network node and the one or more second network nodes;
   compare the rate of change values with the mapping information received from the first network node, and compare the rate of change values estimated with the mapping information received from the first network node;

determine one or more timeToPreTrigger values based on the comparison;

initiate one or more timeToPreTrigger timers based on the corresponding one or more timeToPreTrigger values, the one or more timeToPreTrigger timers corresponding to different second network nodes;

generate one or more measurement reports upon expiration of the one or more timeToPreTrigger timers, wherein a measurement report of the one or more measurement reports includes cell identifiers and corresponding timeToPreTrigger values of the one or more second network nodes;

transmit the one or more measurement reports to the first network node;

receive an indication from the first network node about a second network node of the one or more second network nodes for performing a handover, the indication determined based at least on the one or more measurement reports; and perform the handover from the first network node to the second network node based on the indication received from the first network node.

\* \* \* \* \*